United States Patent [19]

Baum, Jr.

[11] Patent Number: 4,575,943
[45] Date of Patent: Mar. 18, 1986

[54] RIGHT ANGLE MEASURING APPARATUS

[76] Inventor: Fredrick W. Baum, Jr., 1541 Ocean Ave. #308, Santa Monica, Calif. 90401

[21] Appl. No.: 717,910
[22] Filed: Mar. 29, 1985
[51] Int. Cl.⁴ ............................................... G01B 3/10
[52] U.S. Cl. ........................................ 33/138; 33/453
[58] Field of Search ............ 33/138, 1 AP, 453, 137 R

[56] References Cited

U.S. PATENT DOCUMENTS

| 2,718,063 | 9/1955 | Ike | 33/453 |
| 3,191,308 | 6/1965 | Lindenau | 33/138 |
| 3,269,015 | 8/1966 | Barker | 33/138 |
| 3,568,319 | 3/1971 | Moll | 33/138 |
| 3,668,781 | 6/1972 | Teter | 33/138 |
| 3,812,587 | 5/1974 | Elkins et al. | 33/138 |

FOREIGN PATENT DOCUMENTS

| 1938382 | 2/1970 | Fed. Rep. of Germany | 33/138 |
| 1021152 | 2/1953 | France | 33/138 |

Primary Examiner—Willis Little
Attorney, Agent, or Firm—Harvey S. Hertz

[57] ABSTRACT

Apparatus for marking a reference line on a working surface at a predetermined angle or disposition from an established base line. Three tape measures each have a housing and a retractable tape extending therefrom. The free ends of each tape are connected to the housing of one of the other tape measures. The scales on the tapes may be varied from a predetermined norm for ease of reading the scales to determine an exact right angle.

3 Claims, 3 Drawing Figures

RIGHT ANGLE MEASURING APPARATUS

BACKGROUND OF THE INVENTION

1. Field of the Invention

The invention relates, in general, to angle measuring devices, and more particularly, to apparatus for marking a reference line at a predetermined angle from an established base line.

2. Description of the Prior Art

Craftsmen, such as carpenters, find it necessary to mark a reference line (normally 90°) from an established base line. The craftsmen normally utilize the Pythagorean Theorem formulation of:

$$c^2 = a^2 + b^2$$

to determine a right angle.

For example, the craftsmen measures a distance of four feet along an established base line from a given point and then measures a distance of three feet along a reference line extending from said point at approximately a right angle. To determine if the right angle has been correctly formed, the ends of the lines along the base line and the reference line, when connected, should equal five feet. If the distance is not five feet he must then go back and re-execute the reference line to correct for the error. Such techniques have been found to be time consuming, inaccurate and difficult for the craftsman to calculate when the distances involved are more or less than surfaces where a 3-4-5 triange can be constructed.

Other devices for forming right angles are also well known but have been found to be bulky, difficult to read, or not disposed for rapid reading.

One such device is disclosed in U.S. Pat. No. 4,381,607 wherein the tool includes an elongated member from which angle lines or cords are each adapted to extend a predetermined distance such that the intersecting terminal ends of the cords, in combination with the member, form a triangle having sides of known length. In as much as the length of the triangle sides are known, the angles included thereby are also known such that a chalk line connected to the member may be utilized to establish a reference line at a known angular disposition to the member.

In U.S. Pat. No. 2,758,380 three corner pieces are interconnected together by non-flexible stretchable members to form a right angle triangle when the flexible members are in a taut condition.

In U.S. Pat. No. 2,683,933 a pair of members are connected together so that they assume various angular relationships. A flexible member interconnects the ends of the two members so that the combination can simulate respective legs of a triangle, the connection being such that the length of any triangle leg and the angular relationship of the legs may be readily changed.

Other known devices include U.S. Pat. Nos. 3,459,429; 3,885,314; 3,514,863; and 3,269,015.

While certain of the above-mentioned devices may be utilized to determine a right angle with respect to a reference line, none of these devices are simple, compact and yet readily available for large measurements and are easily read by an unskilled craftsman.

The manner in which the invention addresses the disadvantages of the prior art to provide a novel and highly advantageous apparatus for marking a reference line on a working surface at a predetermined angle or disposition from an established line will be understood as this description proceeds.

SUMMARY OF THE INVENTION

The present invention generally provides a measuring device for marking a reference line at a right angle disposition from an established base line.

The apparatus includes three tape measures, each having a housing and a retractable tape extending therefrom. The free end of each tape is connected to the housing of another tape measure. In its retractable form the three housings are in a generally compact configuration. The scales of the tapes may be varied from a normal predetermined scale for ease of reading the scales during operation.

The advantages of this invention both as to its construction and mode of operation will be readily appreciated as the same becomes better understood by reference to the following detailed description when considered in connection with the accompanying drawings in which like reference numerals designate like parts throughout the figures.

DETAILED DESCRIPTION

Figure 1:
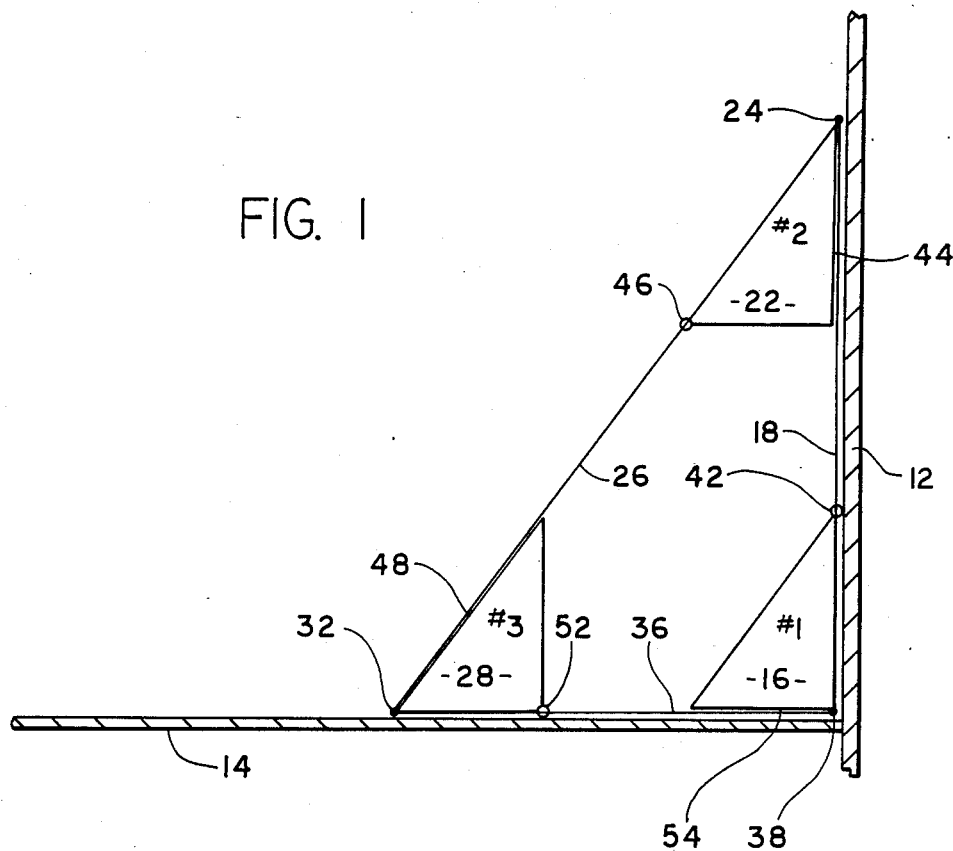
FIG. 1 is a plan view showing the device of the present invention disposed so as to form a 90° reference line with respect to an already established base line.

Referring now to the drawings, there is shown in FIG. 1, a right angle reference line forming apparatus constructed in accordance with principles of the invention. As shown in FIG. 1, there is an established base line 12 such as a wall or other surface, and the apparatus is utilized to mark a reference line 14 on a working surface at a 90° angular disposition from the established base line 12.

As is well known, a right triangle is a triangle, one of whose interior angles is a right angle. That is, one interior angle equals 90°. In addition, as is well known, under the previously pointed out Pythagorean Theorem, should the sum of the length of the legs of the triangle, squared, be equal to the length of the hypotenuse of the triangle squared then a right angle is formed at the side opposite the hypotenuse. Thus, should one of the legs of the triangle be equal to a distance of three units and another of the legs be equal to a distance of four units and the hypotenuse of such a triangle be equal to a distance of five units, then the angle opposite the hypotenuse would be a right angle. Of course, other units other than the combination of 3, 4, 5 units could be used to form a right triangle.

Thus, in the present invention, a first generally triangular shaped tape measure 16 having a tape 18 is formed so that the tape 18 is retractable into the tape measure 16. The free end of the tape 18, however, is connected to a second tape measure 22 at its corner 24. The second tape measure 22 contains a tape 26 which is retractable into the tape measure 22 and is connected at its free end to a third tape measure 28 at a corner 32. The third tape measure 28 has a tape 36 which is connected at its free end to the corner 38 of the first tape measure 16.

Typically, the tape measures 16, 22 and 28 are of general triangular configuration enabling the sides of the tape to be juxtaposed with the tape measure side walls as shown in the drawing. Thus, the tape 18 of first tape measure 16 extends from the tape measure opening 42 and is juxtaposed with the side wall 44 of second tape measure 22. Tape 26 of second tape measure 22 extends from the opening 46 of tape measure 22 and is juxtaposed along the side wall 48 of third tape measure 28. Finally, tape 36 extends from the opening 52 of third tape measure 28 and extends along the side wall of first tape measure 16 terminating at corner 38.

When determining a right angle along a reference line 14 with respect to a base line 12, the tape measure 16 is placed along the base line as shown in FIG. 1 and its tape measure 18 extends juxtaposed with the surface of the base line 12. When the tape measure 18 indicates a distance of three units along the base line 12 from point 38 to point 24 and the tape measure 36 indicates a distance of four units along the proposed reference line 14 from point 32 to point 38 and simultaneously the tape 26 indicates a distance of five units between point 24 and point 32, a right angle has been formed between the base line 12 and the reference line 14. It should be noted that the tape is normally the tape measure opening and the fixed length of the tape wall added to determine the triangle leg length. For example, the length of the triangle leg along the base line 12 can be computed by adding the length of tape 18 which extends from tape measure opening 42 to point 24 on the second tape measure 22 and then adding the length of the side wall of tape measure 16 from its opening 42 to point 38. Alternatively, tape measure 18 could be adjusted so that the length reading at opening 42 would automatically include the length of the tape measure 16 wall from point 38 to opening 42.

Tape 36 in turn is used to determine the length between points 32 and 38 and tape 26 is used to determine the length between points 24 and 32.

Figure 2:
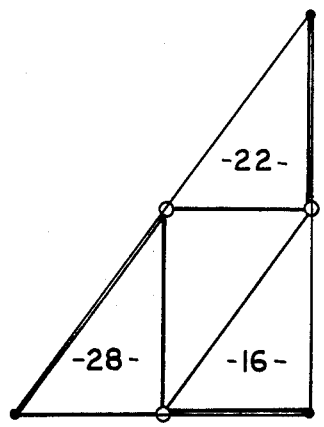
FIG. 2 is a plan view of the apparatus of FIG. 1, showing the device in a contracted position.

FIG. 2 illustrates the apparatus with the tape measure into retracted position. It should further be noted that the tapes could be made to be removable from the point of contact with the adjacent tape, enabling the craftsman to carry the tapes in a disassembled configuration.

Figure 3:
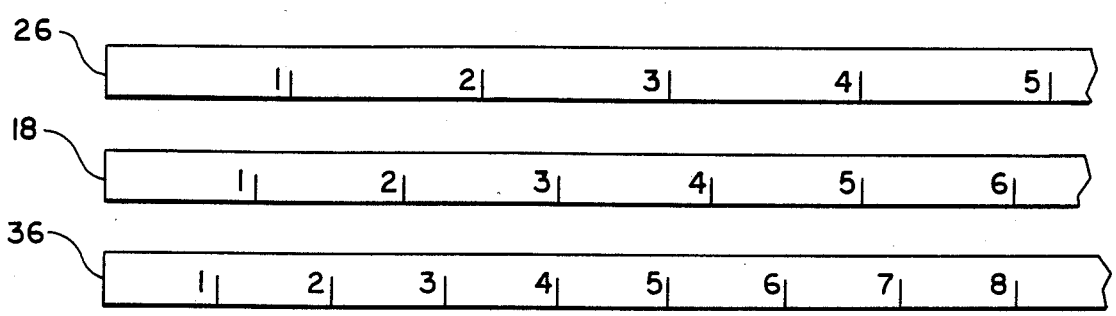
FIG. 3 is a partial plan view of the tapes utilized in the apparatus of FIG. 1.

Referring now to FIG. 3, an alternative arrangement is utilized for aiding semi-skilled craftsmen in reading the units of measurement on the tape. Rather than requiring that the craftsman read three units or multiples thereof on tape 18, four units on tape 36 and five units on tape 26, an expedited method would be to vary the scale on two of the tapes by a predetermined amount. Thus should tape 36 remain with a fixed scale, and the scale of tape 26 be decreased 25 percent and the scale of tape 18 be increased 25 percent, the craftsman need only read the same number on all three scales to determine that he now has a right triangle. These relative scales are illustrated in FIG. 3.

I claim:

1. An angle measuring apparatus comprising:
three tape measures each having a housing and a tape extending therefrom;
the tape of the first of said tape measures being connected to the housing of said second tape measure;
the tape of said second tape measure being connected to the housing of said third tape measure; and
the tape of said third tape measure being connected to the housing of said first tape measure;
said tape measures being adjustable such that the indicia output on each are identical when said apparatus indicates a right triangle.

2. An angle measuring apparatus in accordance with claim 1 wherein said apparatus is used to form and measure the legs of a triangle.

3. Apparatus in accordance with claim 1 wherein said tape measure housings are triangular in shape and are used to form the sides of a right triangle.

* * * * *